United States Patent [19]
Hilgers

[11] Patent Number: 4,728,993
[45] Date of Patent: Mar. 1, 1988

[54] ILLUMINATION SYSTEM IN A PROJECTION COPIER

[75] Inventor: Horst Hilgers, Bad Schwalbach, Fed. Rep. of Germany

[73] Assignee: Hoechst Aktiengesellschaft, Frankfurt am Main, Fed. Rep. of Germany

[21] Appl. No.: 911,006

[22] Filed: Sep. 24, 1986

[30] Foreign Application Priority Data

Sep. 29, 1985 [DE] Fed. Rep. of Germany ....... 3534473
Apr. 3, 1986 [DE] Fed. Rep. of Germany ....... 3611086

[51] Int. Cl.$^4$ .............................................. G03B 27/54
[52] U.S. Cl. ........................................ 355/70; 355/71; 355/30; 355/37
[58] Field of Search ....................... 355/70, 71, 35, 37, 355/30

[56] References Cited

U.S. PATENT DOCUMENTS

| | | | |
|---|---|---|---|
| 3,272,066 | 9/1966 | Rice | 88/24 |
| 3,428,397 | 2/1969 | Elmer | 355/11 |
| 3,669,538 | 6/1972 | Fowler | 355/70 |
| 3,777,135 | 12/1973 | Rees | 355/70 |
| 3,850,523 | 11/1974 | Skavnak | 355/70 |
| 4,006,984 | 2/1977 | Friese | 355/11 |
| 4,095,881 | 6/1978 | Maddox | 355/30 |
| 4,143,964 | 3/1979 | Ogura et al. | 355/30 |

FOREIGN PATENT DOCUMENTS

2160439 9/1976 Fed. Rep. of Germany .
2139326 5/1981 Fed. Rep. of Germany .
489818 6/1970 Switzerland .

*Primary Examiner*—Monroe H. Hayes
*Attorney, Agent, or Firm*—Schwartz, Jeffery, Schwaab, Mack, Blumenthal & Evans

[57] ABSTRACT

An illumination system according to the invention has three radiating units along each longitudinal side and two radiating units along each transverse side of the illumination system. The radiating units are arranged symmetrical to the imaginary center lines in longitudinal and transverse directions of the illumination system. Each individual radiator unit at the transverse side includes a radiating source surrounded by three heat-protection filters while, in each of the three radiator units along the longitudinal side, one of the heat-protection filters is substituted by a reflector plate. The reflector plates of the left-hand and right-hand radiating sources are beveled rectangles, while the reflector plate of the middle radiating source is a rectangle without a beveled upper edge. Along the longitudinal and transverse sides of the illumination system are arranged reflectors, which consists of two reflector parts, which are detachable from each other at a separating point. The individual reflector parts consist of reflector segments which enclose different angles with one another.

22 Claims, 7 Drawing Figures

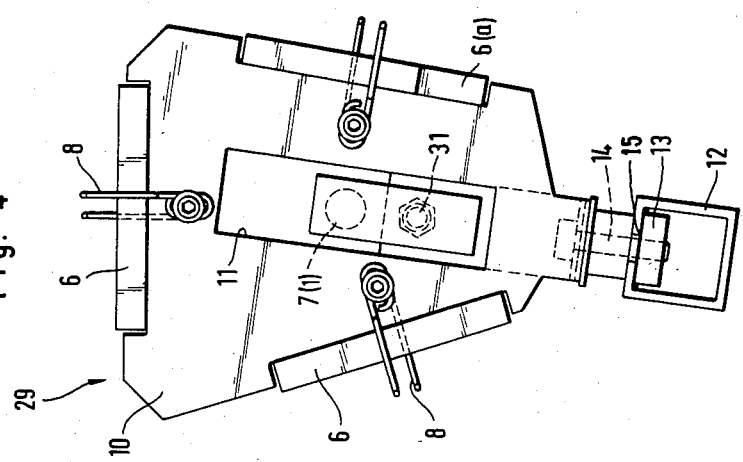
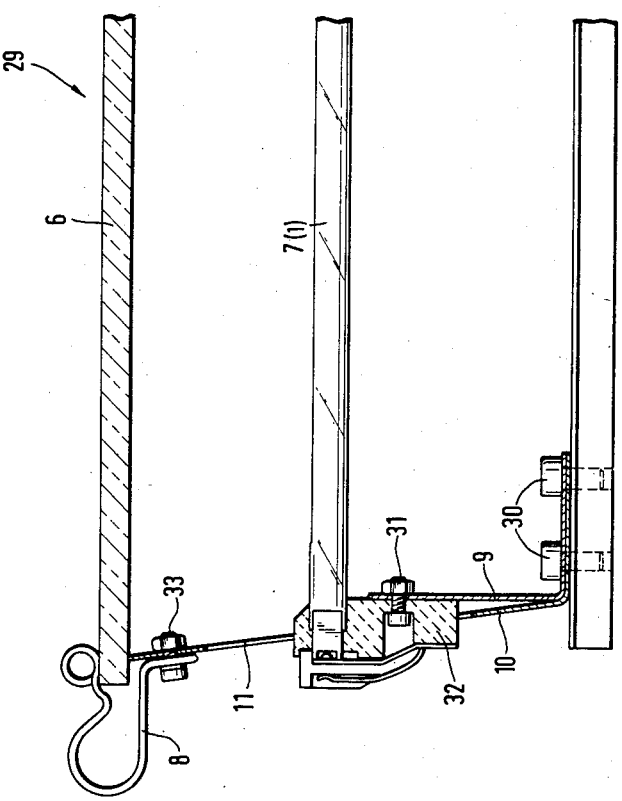

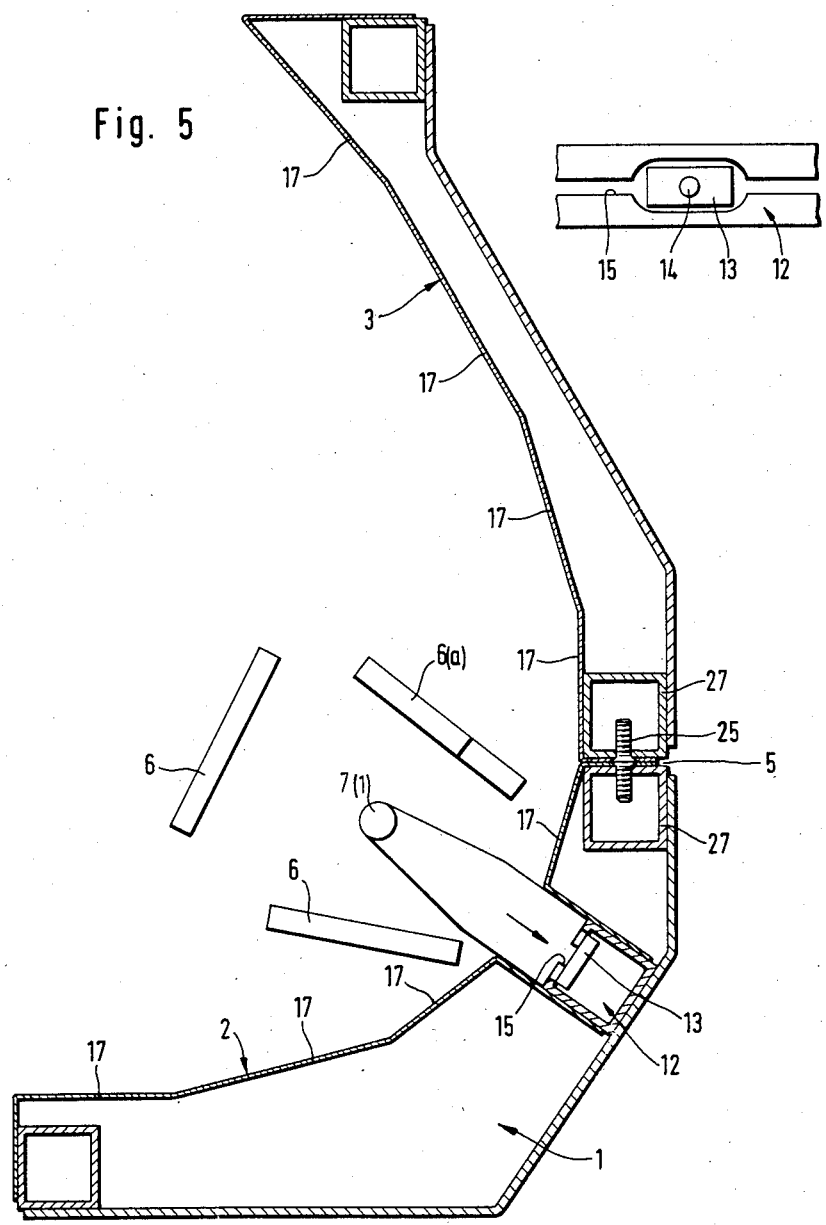

ILLUMINATION SYSTEM IN A PROJECTION COPIER

BACKGROUND OF THE INVENTION

The invention relates to an illumination system in a projection copier for the illumination and projection of an original onto a light-sensitive recording material, with an original platform to receive the original, with radiating sources which are partially surrounded by reflectors, which reflect the incident radiation in the direction of the original.

German Patent Specification No. 2,452,979 discloses such an illumination system in which two radiating sources are arranged on the longitudinal sides, symmetrical to the center line, of the illumination system and are partially surrounded by mirror reflectors, which reflect the incident radiation in the direction of further reflectors. There are two further radiating sources, partially surrounded by mirror reflectors, on the transverse sides of a mount, which mount surrounds an entrance opening of a bellows, on the longitudinal sides of which the previously mentioned radiating sources are provided with the associated mirror reflectors. The further reflectors are likewise designed as mirror reflectors with a flat, strip-shaped middle section, to which concavely curved sections adjoin on either side and extend over the depth of the illumination system. The mirror reflectors and the lower curved sections of the further reflectors are opposite one another, the further mirror reflectors being covered in the direction of the original holder in their entirety by a flange, which projects outward along the border of the mount. Covering the further mirror reflectors by a flange has the effect that, in illumination of the original, an imaging of the same on the recording material is achieved, while avoiding the silhouettes of the edge of the original and without reducing the luminous efficiency.

This known illumination system has no precautions for keeping the thermal radiation of the radiating sources away from the original. If particularly high-power radiating sources are used, as is the case with projection copiers for a large throughput of recording materials, such as for example printing plates, the development of heat within the illumination system is considerable and a corresponding heating-up of the original platform and of the respective original may occur, possibly resulting in undesired thermal stresses in the original holder, which generally has a glass plate, which could adversely affect the projection accuracy onto the recording material.

In U.S. Pat. No. 3,428,397, a copier is described in which symmetrical arrangements of light reflectors project the light onto an original. Each arrangement has a curved mirror reflector, which partially surrounds an elongated light source, and surface without an antireflection coating, diffusely distributing the light, and located between the light source and the original platform.

The curved mirror reflectors consist of two connected parts which have different curvatures from each other. Adjoining each of the mirror reflectors in the upward direction is a non-specular, diffusely reflecting wall which is inclined outward with respect to the longitudinal axis of the illumination system. Similarly, each curved reflector continues downward into a nonspecular, diffusely reflecting wall, which is likewise inclined with respect to the longitudinal axis of the illumination system and rests with its bottom end on the optical lens. The inclination of the lower wall with respect to the longitudinal axis is greater than that of the upper wall. The lower part of the mirror reflector reflects light onto the opposite upper wall, while the upper part of each mirror reflector reflects light onto the opposite lower wall. The light falling on the walls is reflected from them diffusely in all directions. Part of the light from the mirror reflectors is also directed directly onto the original platform. The latter is thus illuminated by light which is directly reflected by the mirror reflectors and by diffuse light which is radiated onto the original platform after several reflections at the diffusely reflecting walls. As well as the inclined, diffusely reflecting walls, this illumination system also has vertical side walls which are highly reflecting. The light rays falling onto these vertical walls are not deflected onto the lens after corresponding reflection as they are covered by corresponding parts of the mirror reflectors. A certain proportion of the diffusely reflected light which falls on the original platform is directly reflected in the direction of the lens. Nevertheless, it has been found that this mirror reflection makes up such a small proportion of the total reflection of the diffusely illuminated original on the original platform that an impairment of the copy quality by the occurence of streaks or punctiform imaging in the copy is negligible. In the case of this illumination system, although a direct illumination of the plane of the original by the light source is avoided by the upper parts of the mirror reflectors drawn towards the middle, an illumination of the borders of the plane of the original by light directly reflected by the mirror reflectors is not avoided. The physical distance of the light sources from the plane of the original is not equal to the depth of the illumination system. The diffusely reflecting walls surround the optical lens for the imaging of the original onto an image carrier. The reflecting elements arranged along one side of the illumination system, namely the upper wall, the mirror reflector and the lower wall, adjoin one another without interruption and are not opposite one another with their reflecting surfaces. The special design of the individual mirror reflector, which consists of two parts with different curvatures, makes manufacture both complex and expensive. Since the upper and lower walls are only diffusely and not specularly reflecting, the luminous efficiency for illumination of the original is small in comparison with the radiant power of the light sources.

U.S. Pat. No. 3,272,066 discloses an illumination system which has four lamps in the four corners of a chamber of the projection copier, which lie opposite to an original window. In the front of each lamp is fastened a reflection plate, which prevents the light of the lamp concerned from falling directly onto the original window and being reflected from there onto a lens optical system. The flat side walls of the chamber are of reflecting design and deflect the lamp light onto the original window. The four lamps of this illumination system interact with the upstream deflection plates to direct the light preferably into the corners of the original window. The deflection plates ahead of the lamps prevent only a direct radiation of the light rays into the center of the original window, but not into its corners as it is a declared aim of the known illumination system to increase the light intensity in the corners in relation to that in the center. The use of a deflection plate for each lamp makes for increased structural complexity.

German Offenlegungsschrift No. 2,160,439 describes an illumination system in which reflectors cast the light from light sources onto a translucent receiving plate for the original. In the case of this illumination system, no measures are taken to prevent a direct illumination of the original and a reflection of the incident light from the first reflectors onto the original in order to obtain a completely shadowless edge illumination of the original. To achieve this, additional light sources are provided instead which eliminate the shadows on the recording material created by the border areas of the original.

Swiss Patent Specification No. 489,818 relates to an illumination system with a reflector system, the individual part-reflectors of which form the wall parts of the equipment housing. In this case, the light source is arranged in a cross-section of the system which is laterally offset with respect to the original holder. Owing to the lateral arrangement of the light source, although there are hardly any problems in avoiding the direct illumination of the original by the light source, several reflectors are necessary to be able to direct the entire radiation emitted by the light source onto the exposure opening in order to obtain a satisfactory light efficiency. The superposition of three light components in this part-reflector system produces a greater emission angle in comparison with one or two reflectors, making possible the illumination of a larger original area since the entire original area, including its border regions, is adequately lit. For this purpose, both a deflection reflector and an echelon reflector deflect the incident radiation directly in the direction of the original, no reflection via a second reflector taking place. The structural complexity of this system is disproportionately great.

German Offenlegungsschrift No. 2,139,326 discloses an illumination system in which, for the illumination of the plane of the original, there are four light sources arranged in one plane and symmetrical to the original. These light sources illuminate, among other things, the original directly, so that the imaging of the shadows of the edges of the original on the copy cannot be excluded.

In the case of the known illumination systems, no measures are taken to keep away the infrared component, i.e., the heat rays of the radiation sources from the original and at the same time to obtain a completely shadowless edge illumination of the original while avoiding a direct reflection, for example, by the glass plate of the original holder, in the direction of the optical system. Another disadvantage in the case of the known illumination systems is that the changing of a light source is time-consuming owing to the complex structure of the illumination systems.

SUMMARY OF THE INVENTION

The object of the invention is to improve an illumination system of the type described at the outset in such a way that a quick change of the individual radiation source is possible without laborious adjusting work and that, in illumination of the original, the thermal radiation of the radiating sources does not fall on the original.

BRIEF DESCRIPTION OF THE DRAWINGS

The invention is explained in more detail below with reference to an exemplary embodiment represented in drawings, wherein:

FIG. 3 is a side view of a radiator unit;

FIG. 4 is a front view of the radiator unit according to FIG. 3;

FIG. 5 shows, on an enlarged scale, a reflector of the illumination system, and, in detail, a view of a guide, along which the individual radiator unit is displaceable;

Figure 1:
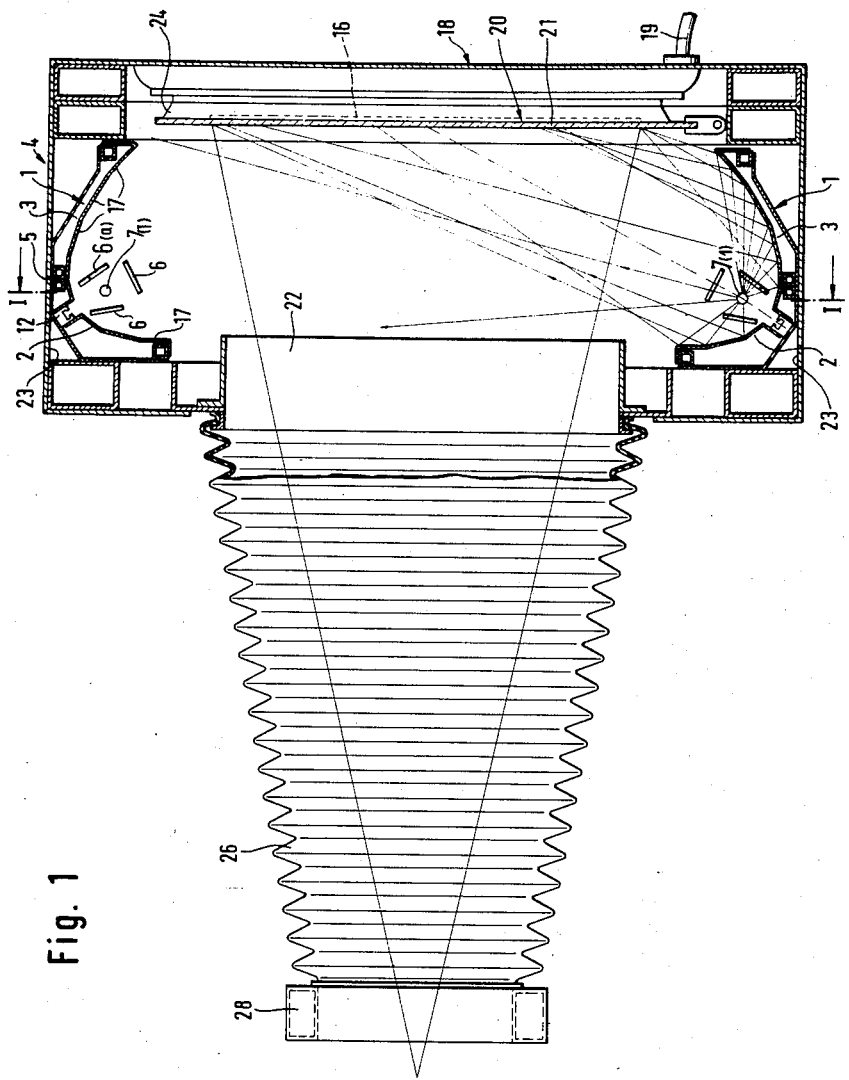
FIG. 1 is a horizontal sectional view of the illumination system according to the invention.

The object of the invention is achieved in a first embodiment by each radiating source in a defined distance to the original, surrounded by heat-protection filters and by each reflector consisting of two reflector parts detachable from each other at a separating point.

To avoid a drop in the intensity of illumination in the image plane toward the image borders, in a second embodiment each radiating source on the transverse wide sides of the illumination system is surrounded by three heat-protection filters and each radiating source on the two longitudinal sides of the illumination system is surrounded by a reflector plate and two heat-protection filters.

Illumination of the original with light from which the heat rays have been filtered out or reflected in the direction of radiating sources and, from there, the heated air being carried away from the illumination system by means of fans produces the advantage of an even temperature control of the original holder while avoiding a gradual heating-up in lengthy operation of the illumination system, and thus a uniform quality of the copies made from the original. Added as a further considerable advantage is the fact that the individual reflectors consist of two reflector parts which are detachable from each other at a separating point, so that, in the event of failure of a radiating source, the corresponding reflector part to which the radiating source is connected can be separated from the other reflector part and pushed away to have easy access to the radiator units, so that a quick changing of the defective radiating source is possible.

By substituting one heat-protection filter by a reflector plate in the radiator units which are arranged along the longitudinal sides of the illumination system, the advantage is achieved that a light distribution is obtained in the plane of the original which produces a higher intensity of illumination at the borders of the original and the corners of the original than in the center, it being ensured thereby in the imaging of the original into the image plane that the decrease in brightness caused by the lens compared with the center is compensated and an even intensity of illumination in the image plane is obtained.

An illumination system according to the invention has three radiating units along each longitudinal side and two radiating units along each transverse side of the illumination system. The radiating units are arranged symmetrical to the imaginary center lines in longitudinal and transverse directions of the illumination system. Each individual radiator unit at the transverse side includes a radiating source surrounded by three heat-protection filters while, in each of the three radiator units along the longitudinal side, one of the heat-protection filters is substituted by a reflector plate. The reflector plates of the left-hand and right-hand radiating sources are beveled rectangles, while the reflector plate of the middle radiating source is a rectangle without a beveled upper edge. Along the longitudinal and transverse sides of the illumination system are arranged reflectors, which consists of two reflector parts, which are detachable from each other at a separating point. The individual reflector parts and consist of reflector segments which enclose different angles with one another.

DETAILED DESCRIPTION OF THE INVENTION

In each of the FIGS. 1 to 5, two embodiments of the illumination system are represented. These differ from each other by the radiating sources along the longitudinal sides. In one embodiment two heat-protection filters 6,6 and a reflector plate 6a (6b or 6c) surround the radiating source. In the other embodiment a further heat-protection filter 6 instead of the reflector plate surrounds the radiating source. To distinguish the two embodiments in the drawings, in FIGS. 1 to 5, the indices 1, 2, 3 of the radiating sources $7_1$, $7_2$, $7_3$ and the index 'a' of the reflector plate 6a of the second embodiment are given in parentheses. For the first embodiment, the reference numerals without the above-mentioned indices the parentheses apply, i.e., the radiating sources are uniformly denoted by the reference numeral 7 and the heat-protection filters by the reference numeral 6. In the case of the second embodiment in each of FIGS. 4 and 5, the beveled upper edge of the reflector plate 6a is drawn as a parallel line to the narrow sides of the reflector plate. This drawn-in edge does not exist in the first embodiment where heat-protection filter 6 is used rather than reflector plate 6a.

Inside the first embodiment of the illumination system 4, represented in FIG. 1, radiating sources 7 are arranged at a certain distance from the light-reflecting surface of a reflector 1. The radiating sources 7, for example, burners are surrounded by heat-protection filters 6 in such a way that each ray falling on an original 16 has first passed through one of the three heat-protection filters 6. The opposite position of the individual radiating source 7 and the associated heat-protection filter 6 on the one hand and the reflector 1 on the other hand is such that the rays falling directly on the original 16, i.e., the non-reflected rays, have passed through one of the heat-protection filters 6 and, furthermore, the rays only falling on the original 16 after reflection at the reflector 1 have already passed through one of the two remaining heat-protection filters 6 before the reflection at the surface of the reflector 1. The heat-protection filters are filters known for such purposes, so that a closer description of the filters is not included here. The heat-protection filters 6 block the infrared component, or the heat rays of the incident radiation from the individual radiating source 7. Only the so-called cold light component passes through the heat-protection filter 6 and falls on the original 16 either directly or after reflection at the surface of the reflector 1. The air around the radiating sources 7 which is heated by the blocked thermal radiation is carried away from the illumination system 4 by fans, not shown, so that a too intensive heating of the radiating sources 7 is prevented.

As is apparent from the paths of rays schematically drawn in FIG. 1, the individual rays fall on the original 16 at such an angle that there is no direct reflection of the rays in the direction of an exit opening 22 of a bellows 26, at the end of which opposite the exit opening 22 is arranged a shutter 28 for an optical system. To this extent, the original 16 is illuminated by the illumination system 4 in a way in which a direct reflection, for example, by a glass cover 21 of an original holder 20 in the direction of the optical system, not shown, is avoided.

Along each side wall 23 of the illumination system 4 is arranged a reflector 1, which in each case consists of two reflector parts 2 and 3, which are detachable from each other at a separating point 5, as will be described in more detail later. The individual reflector 1 or the reflector parts 2 and 3 consist of plane reflector segments 17, two adjoining reflector segments 17, 17 enclosing an angle with each other between 14° and 22°. The reflector part 2 has a guide 12, in which the individual radiator unit 29 (cf. FIGS. 3 and 4), consisting of a radiating source 7 and the associated three heat-protection filters 6, is inserted and positionable.

Embossed sheets, the surfaces of which are sealed for protection against oxidation, are used as material for the reflector segments 17. Aluminum sheets which are plated with high-purity aluminum are particularly suitable for this.

The distances of the radiating sources 7 from the plane of the original lie in the range from 270 to 295 mm, in particular the distance is 280 mm. The distance of a nearest edge of the original to a radiating source is 165 to 175 mm, in particular 170 mm. By maintaining the mutual position of plane of the original, edge of the original and radiating sources, it is ensured that the light reflected from each reflector segment 17 covers the entire format length and width of the original 16, respectively. As a consequence of segmenting of the reflectors 1, it is possible, after appropriate choice of the angles which the individual reflector segments include with one another, to concentrate the light reflected by one or more reflector segments to a narrower range to compensate for any possible "light holes", regions where the illumination is less than in the surrounding regions, i.e., to illuminate the "light holes" with the same light intensity as the remaining regions. Shadows of the edges of the original are substantially illuminated by the highly oblique incident rays of the front reflector segments.

Instead of three individual plane heatprotection filters 6, a single tubular heat-protection filter, for example, of Duran ® glass, provided with an IR-reflecting coating, may also surround the radiating source 7 and keep back the thermal radiation emitted by the source 7. This heat-protection filter in the form of a glass tube, not shown, may, for example, rest on two support points of a base, which bears the radiating source, and be held in its position by a spring.

The illumination system 4 has, in addition to the radiating sources 7, a radiating source which is not shown, likewise a burner, for the direct transillumination of an original, such as a transparent film and its projection through the bellows 26 via the optical system onto the recording material. This additional radiating source is not shown in the illumination system for reasons of better clarity, as in this context it need only be said that this radiating source is moved by a motor across the original holder 20 to transilluminate the original 16.

The illumination system is, for example, set up for original sizes up to 500×710 mm. The exposure times for reflected light, in which the original is illuminated by the radiating sources 7 in conjunction with the reflectors 1, are 5 to 6 secs., about a third of the required exposure time of the illumination system with light sources of the same intensity of illumination described in German Patent Specification No. 2,452,979.

For a transmitted-light projection, in which the transparent film as original is projected onto the recording material by the one halogen radiator moving across the original platform, the exposure time is about 4 sec.

The original holder 20 is arranged in the rear of a hinged door 18 of the illumination system 4 for receiving the original. The original holder 20 is optionally equipped with or without a suction device and is connected to a vacuum pump, not shown, via a line 19. For smooth pressing of the original 16 onto the surface of the copy holder 20, the glass cover 21 is provided, which rests on a surrounding seal 24. A gas-pressure damper, not shown, supports the opened glass cover 21 against the hinged door 18 and ensures that the opened glass cover remains in its respective position, so that the original 16 can be inserted into the original holder 20 without any obstruction. The hinged door 18 is, incidentally, in connection with the housing of the illumination system 4, via a further gas-pressure damper, not shown, the gas-pressure damper aiding the manually executed closing or opening movements of the hinged door 18.

Figure 2:
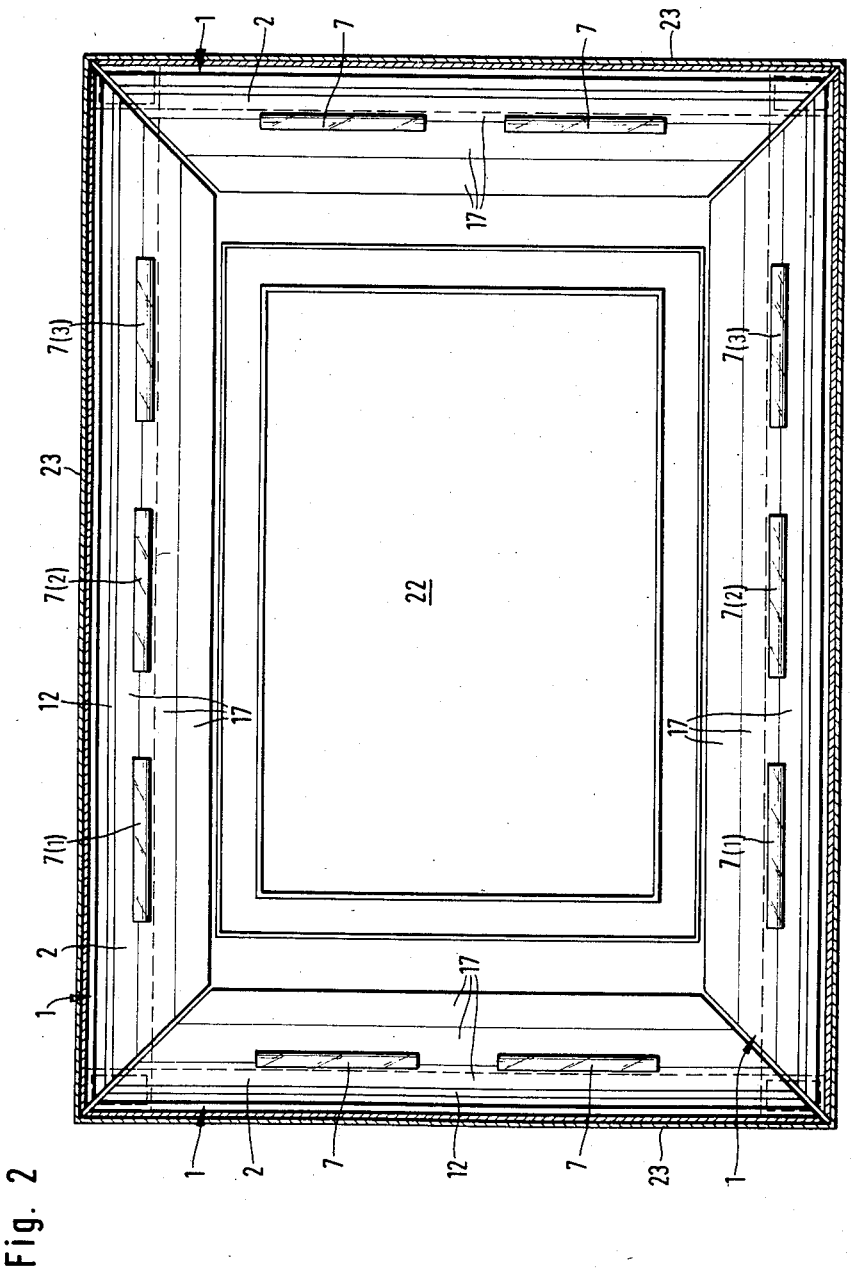
FIG. 2 is a sectional view of the illumination system along the line I—I in FIG. 1.

As is apparent from FIG. 2, in the case of the first embodiment, there are three radiating sources 7 arranged at each longitudinal side and two radiating sources 7 arranged at each transverse side of the illumination system 4, symmetrical to imaginary center lines in the longitudinal and transverse directions, respectively.

The second embodiment of the illumination system has three radiating sources $7_1$, $7_2$, $7_3$ at the longitudinal sides and two radiating sources 7 at the transverse sides of the illumination system, in the same arrangement as the first embodiment.

In the case of both embodiments, the reflectors 1 of the longitudinal and transverse sides are brought together at their joints with a 45° miter but leaving a gap of 2 to 3 mm. This joint gap of 2 to 3 mm width makes possible a certain thermal expansion of the reflectors 1 with heating up during lengthy operation, without thermal stresses and deformations of the reflectors 1 occurring. The side walls 23 of the housing of the illumination system 4 are matt black, so that they absorb any incident radiation. The exit opening 22 of the camera bellows 26 has a rectangular cross-section, which is apparent from FIG. 2.

The radiator unit 29 of the first embodiment, shown in FIG. 3 in side view, consists of in each case one radiating source 7 and the three heat-protection filters 6 surrounding it. The radiating source 7 is fastened in a block 32, which is screwed to an angular bracket 9 by means of a screw 31. The block 32 passes through a cutout 11 of a bracket 10 for the three heat-protection filters 6. Each of the heat-protection filters 6 is held in its position by a bent retaining spring 8, which is screwed to the bracket 10 via a screw 33. As can be seen from the front view, according to FIG. 4, of the radiator unit 29, each of the heat-protection filters 6 is fitted in a border cutout of the bracket 10, so that lateral slipping is not possible.

The radiator unit 29 of the second embodiment, likewise shown in side view in FIG. 3, which is arranged at one of the longitudinal sides of the illumination system 4, consists of a radiating source $7_1$ and the two heat-protection filters 6 surrounding it, as well as a reflector plate 6a, which is provided instead of the third heat-protection filter of the first embodiment. The radiating source $7_1$ is fastened in a block 32, which is screwed to an angular bracket 9 by means of a screw 31. The block 32 passes through a cutout 11 of a bracket 10 for the two heat-protection filters 6 and the reflector plate 6a. Each of the two heat-protection filters 6 and the reflector plate 6a are held in their positions by a bent retaining spring 8, which is screwed to the bracket 10 via a screw 33. As can be seen from the front view, according to FIG. 4, of the radiator unit 29, the heat-protection filters 6 and the reflector plate 6a are in each case fitted in a border cutout of the bracket 10, so that a lateral slipping is not possible.

The bracket 9 and the likewise angular bent bracket 10 for both embodiments lie with their horizontally running bent parts one above the other and are connected to a rail, not shown in more detail, of the radiator unit 29 by screws 30.

This rail is insertable in a guide 12 in the form of a square profile and is displaceable and positionable along this guide, as is explained more closely with reference to FIG. 5.

As FIG. 5 shows, the guide 12 is arranged in that reflector part 2 of the reflector 1 which is further away from the original holder 20 for the original 16 than the reflector part 3. The number of reflector segments 17 of each of the reflector parts 2 and 3 is four. In general, the reflector segments 17,17, . . vary in length. Four of the reflector segments 17 may also be of the same length in pairs, i.e., two reflector segments in each case have the same length, but the individual pairs again have different lengths with respect to each other.

The guide 12 which, as already mentioned, is a square tube, has a milled slot 15, through which the rail of each radiator unit 29 is inserted and in which it can be displaced. The slot 15 of the guide 12 has in each case, at its ends, a widening, through which a small block 13, with a width larger than the slot width, can be pushed in. The small block 13 is in engagement with a screw 14, which passes through the slot 15 and rests by the underside of its screw head on the rail of the radiator unit 29. If the screw 14 is loosened, the rail can be displaced along the slot 15. As soon as the specified position of the individual radiator unit 29 has been reached, the screw 14 is tightened, so that the small block 13 rests from below against the slotted side of the square profile of the guide 12, and thus the radiator unit 29 is fixed in its position. The widening of the slot 15 is shown in FIG. 5a in plan view, in the detail.

To facilitate the adjustment of the individual radiator unit 29 and the changing of defective radiating sources 7, the two reflector parts 2 and 3 are detachable from each other at the separating point 5 of the individual reflector 1. For this purpose, at the separating point, each of the reflector parts 2 and 3 is equipped with a square profile 27 and the adjoining side surfaces of the two square profiles are connected to each other by a setting plug 25. This produces an easily detachable plug connection of the two reflector parts 2 and 3, so that when changing the individual radiator units 29, only the reflector part 2 has to be displaced out of the housing of the illumination system 4, after detachment at the separating point 5, while the other reflector part 3 remains in its place. The radiating sources 7 or $7_1$, $7_2$, $7_3$ of the radiator units 29, arranged in the reflector part 2, can then be changed without taking a great deal of time.

In FIG. 5, the radiator unit of the second embodiment, with the radiating source 7₁, is represented in section, the radiating source in question being the left-hand one (see FIG. 2) at one of the longitudinal sides of the illumination system 4. The radiating source $7_1$ is surrounded by two heat-protection filters 6,6 and a first reflector plate 6a, which has the outline shown in FIG. 6. The reflector plate 6a is arranged between the radiating source 7₁ and the reflector part 3. The bevel of the upper edge of the first reflector plate 6a is directed away from the reflector 1 and points towards the original 16.

Figure 6:
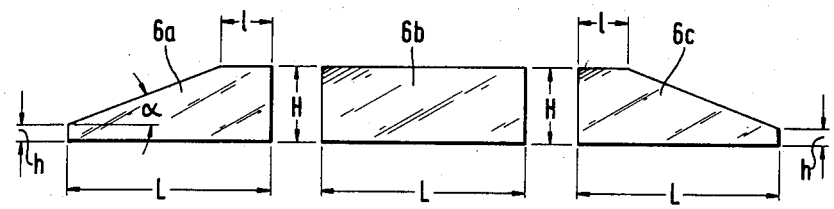
FIG. 6 illustrates reflector plates of the radiator units, which are arranged on the longitudinal sides of the illumination system.

FIG. 6 shows the outlines of the first, second and third reflector plates 6a, 6b, 6c, which are assigned to the three radiating sources $7_1$, $7_2$, $7_3$ lying next to one another along one longitudinal side of the illumination system 4. The first and third reflector plates 6a, 6c each have a rectangular form with beveled upper edge, while the second reflector plate 6b, which is assigned to the middle radiating source $7_2$, is a rectangle without bevel. The angle which the beveled upper edge encloses with the longitudinal side of the first or third reflector plate 6a and 6c respectively, is 18°-20°. The third reflector plate 6c, assigned to the right-hand radiating source $7_3$, is directed with its beveled upper edge toward the reflector 1 of the illumination system 4. The reflector plates 6a, 6b, 6c are, for example, embossed and surface-sealed for protection against oxidation. Suitable plate materials are aluminum sheets, plated with high-purity aluminum.

In an imaging of an original, on the image plane there is a brightness reduction toward the image borders, caused by the lens of the imaging optical system, which has the effect in the production of printing forms from printing plates of a reduction of the print quality toward the borders. For the particular image point observed in the image plane, the cos⁴ law generally applies for the intensity of illumination, which states that the intensity of illumination E(ω) at the image point is given by $$E(\omega) = E \cdot \cos^4,$$

with the intensity of illumination E at the intersection of the optical axis of the imaging optical system with the image plane and the image angle ω between the optical axis and the joining line from the lens to the image point.

Figure 7:
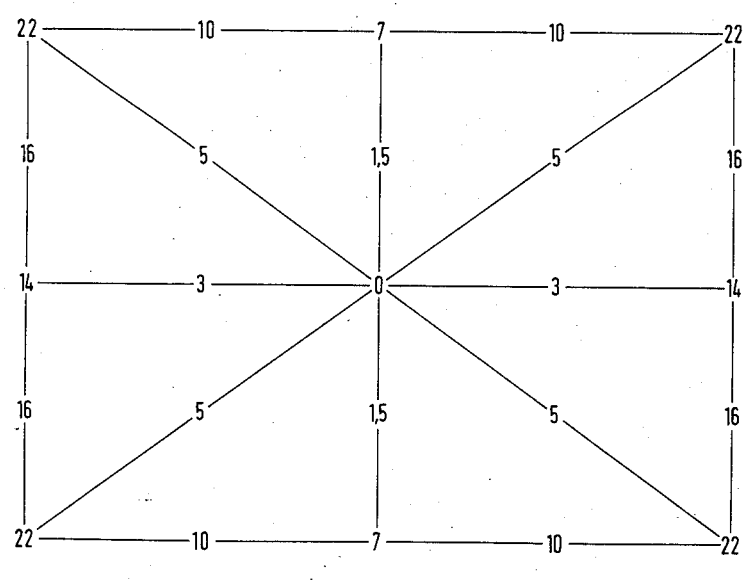
FIG. 7 shows the intensity of illumination at various points of an original format.

In other words, this means that the intensity of illumination in the plane of the original for the respective image point must be all the greater in comparison with that at the intersection of the optical axis with the plane of the original, the greater the image angle ω is. To obtain an even intensity of illumination on the image level, the distribution of the intensity of illumination at the various points of a given original format in the plane of the original must, for example, correspond to the distribution represented in FIG. 7. The numbers at the individual points specify how many percent the intensity of illumination is higher than at the center of the original format. With this distribution of the intensity of illumination in the plane of the original, a distribution of the intensity of illumination in the image plane is obtained which produces maximum deviations of ±5% from the desired value.

The dimensions of the rectangles on which the reflector plates are based, which have, for example, a length L=210 to 230 mm and a height H of 50 to 70 mm, in particular of L=220 mm and H=60 mm, an angle α of 18° to 20°, a parallel side 1 of 65 to 75 mm to the length L and a narrow side h of 8 to 15 mm, in particular of 10 mm, to the height H in the case of the beveled first and third reflector plates 6a, 6c, ensure that the intensity of illumination in conjunction with the reflector 1 for the individual point on the original substantially corresponds to the equation $E(\omega) = E \cdot 1/\cos^4\omega$, i.e., the brightness decrease is compensated in accordance with the so-called cos⁴ law for the image point. It goes without saying that, in imaging, a lens may also be used in the imaging optical system which has the effect of a brightness decrease according to the cos⁵ law or another function. By appropriately matched dimensions and outlines of the reflector plates, this brightness decrease can also be compensated on the image plane in such a way that corresponding differentiated intensities of illumination according to the cos⁵ law are radiated onto the plane of the original.

With the invention, an illumination system is created in which the radiation range covered by the heatprotection filters is fully available for the illumination of the original. In practice, this means that, for instance, a radiation range which is radiated at a solid angle of about 230° to 260° from the radiating sources falls on the original.

What is claimed is:

1. An illumination system in a projection copier for the illumination and the projection of an original onto a light sensitive recording material comprising:
   (a) platform means for receiving the original;
   (b) a plurality of reflectors;
   (c) radiating source means partially surrounded by said reflectors for reflecting incident radiation in the direction of the original, each of said reflectors comprising two reflector parts detachable from each other at a separating point and equipped at the separating point with a square profile, wherein the adjoining side surface of each part's square profile is connected to the other by a setting plug; and
   (d) a plurality of heat-protection filters partially surrounding each radiating source.

2. An illumination system as claimed in claim 1, wherein said heat-protection filters substantially surround said radiating sources on three sides, whereby said heat-protection filters reflect back the infrared component of radiation from said radiating sources and transmit the remaining radiation components.

3. An illumination system as claimed in claim 1, wherein each reflector comprises plane reflector segments which enclose angles with one another of between about 14° and 22°.

4. An illumination system as claimed in claim 3, wherein said reflector segments vary in length.

5. An illumination system as claimed in claim 3, wherein the number of reflector segments of each reflector part is four.

6. An illumination system as claimed in claim 3, wherein the lengths of the reflector segments are dimensioned so that the rays emitted by the radiating sources are reflected by each reflector segment over the whole length/width of the original respectively a definable portion of the original for the elimination of light holes.

7. An illumination system as claimed in claim 1, wherein the illumination system includes two pairs of opposite sides, three radiating sources being located on end of one pair of opposite sides of the illumination system parallel to a longitudinal center line, and two radiating sources being located on each of the other pair of opposite sides of said illumination system parallel to a transverse center line.

8. An illumination system as claimed in claim 1, wherein the position of the heat-protection filters relative to the radiation sources and the reflectors is chosen such that each ray falling on the original passes through one of the heat-protection filters.

9. An illumination system as claimed in claim 1, wherein the reflectors of the longitudinal and transverse sides are brought together at joints with a 45° miter and with a gap of 2-3 mm.

10. An illumination system as claimed in claim 1, wherein each radiating source forms with the heat-protection filters surrounding, it a radiator unit, said radiator unit comprising a first bracket for the heat-protection filters and a second bracket for the radiating source.

11. An illumination system as claimed in claim 10 further comprising a rail on which brackets are fastened and a square guide having a slot, wherein each radiator is inserted by the rail into the guide, and is displaceable and positionable along the guide.

12. An illumination system as claimed in claim 11, wherein the guide is arranged in a part of the reflector which is further away from the holder for the original than the other reflector part.

13. An illumination system as claimed in claim 10 further comprising a retaining spring, wherein each of the heat-protection filters is held securely in position in a border cutout of the first bracket with the retaining spring fastened on the first bracket.

14. An illumination as claimed in claim 10 further comprising a block detachably fastened on the second bracket to support the radiating source and a cutout in the first bracket, wherein the block extends through the cutout in the first bracket.

15. An illumination system as claimed in claim 11 further comprising a screw having a head which rests on the rail of the radiator unit and a small block in engagement with the screw and having a width greater than the slot width in the guide wherein the small block is inserted through the slot and rests against the slotted side of the guide during fixing of the radiator unit in the desired position along the guide.

16. An illumination system as claimed in claim 1, wherein each radiating source at two transverse sides of the illumination system is surrounded by three heat-protection filters and each radiating source at two longitudinal sides of the illumination system is surrounded by one reflector plate and two heat-protection filters.

17. An illumination system as claimed in claim 16, wherein the reflector plates of the radiating sources lying alongside one another have configurations which distribute the light of each individual radiating source onto the plane of the original, so that the decrease in intensity of illumination with evenly illuminated plane of the original, caused by the lens, is compensated at the image plane.

18. An illumination system as claimed in claim 16 wherein said one reflector plate is in each case arranged between the radiating source and the longer of two reflector parts of a reflector in the radiator unit.

19. An illumination system as claimed in claim 18, wherein the dimensions and the outlines of the reflector plates are chosen such that the intensity of illumination in the plane of the original corresponds approximately to the $\cos^4$ law for the respective image point.

20. An illumination system in a projection copier for the illumination and the projection of an original onto a light sensitive recording material comprising;
    (a) platform means for receiving the original;
    (b) a plurality of reflectors, each of said reflectors comprising two reflector parts detachable from each other at a separating point; and,
    (c) radiating source means partially surrounded by said reflectors for reflecting incident radiation in the direction of the original wherein each radiating source at two transverse sides of the illumination system is surrounded by three heat-protection filters and each radiating source at two longitudinal sides of the illumination system is surrounded by two heat-protection filters and one reflector plate arranged between the radiating source and the longer of two reflector parts of a reflector in the radiator unit, wherein said one reflector plate corresponding to said radiating source at each end along the longitudinal axis of said illumination system is a rectangle beveled along the upper edge and said one reflector plate corresponding to the middle radiating source along the longitudinal axis of said illumination system is a rectangle.

21. An illumination system as claimed in claim 20, wherein the beveled upper edge of the first said one reflecting plate is directed away from the reflector and the beveled upper edge of the other said one reflecting plate is directed toward the reflector.

22. An illumination system as claimed in claim 20, wherein the bevel of the upper edge of said reflector plates encloses an angle $\alpha = 18°-20°$ with the longitudinal side of the reflector plate.

* * * * *